United States Patent
Dinc et al.

(10) Patent No.: US 6,542,483 B1
(45) Date of Patent: Apr. 1, 2003

(54) METHOD AND AN APPARATUS FOR EB/NT ESTIMATION FOR FORWARD POWER CONTROL IN SPREAD SPECTRUM COMMUNICATIONS SYSTEMS

(75) Inventors: Abdulkadir Dinc, Jersey City, NJ (US); Aparna A. Khurjekar, Basking Ridge, NJ (US)

(73) Assignee: Motorola, Inc., Schaumburg, IL (US)

( * ) Notice: Subject to any disclaimer, the term of this patent is extended or adjusted under 35 U.S.C. 154(b) by 98 days.

(21) Appl. No.: 09/708,325

(22) Filed: Nov. 8, 2000

(51) Int. Cl.$^7$ .......................... H04Q 7/00; H04B 7/216
(52) U.S. Cl. ................ 370/332; 370/335; 455/522; 375/349
(58) Field of Search ................ 370/209, 252, 370/333, 334, 332, 335, 342; 455/67.1, 226.3, 133, 222, 225, 101, 135, 136, 522; 375/130, 144, 267, 329, 346, 349

(56) References Cited

U.S. PATENT DOCUMENTS

| | | | | |
|---|---|---|---|---|
| 5,619,524 A | * | 4/1997 | Ling et al. | 375/200 |
| 5,671,221 A | * | 9/1997 | Yang | 370/320 |
| 5,737,327 A | * | 4/1998 | Ling et al. | 370/335 |
| 5,767,738 A | * | 6/1998 | Brown et al. | 329/304 |
| 6,154,659 A | * | 11/2000 | Jalali et al. | 455/522 |

* cited by examiner

*Primary Examiner*—Huy D. Vu
*Assistant Examiner*—Duc Ho
(74) *Attorney, Agent, or Firm*—Hisashi D. Watanabe

(57) ABSTRACT

A spread spectrum communications CDMA system (10) in which power control mitigates received signal fluctuations due to Rayleigh fading and hence achieve optimal system (10) capacity. The method and hardware implementation (42) is described for the inner loop (26) fast forward power control algorithm for a CDMA2000 handset. Good performance shown with the simulation results and a simple Application Specific Integrated Circuit (ASIC) implementation is achieved with a method and an apparatus (42) for the implementation of Eb/Nt estimation for inner loop (26) forward power control in CDMA2000 mobile station. The IS-95A system (10) employs a slow power control scheme for the Forward link (26). In the CDMA2000 system (10), a power control subchannel is introduced for a faster forward power control mechanism.

15 Claims, 6 Drawing Sheets

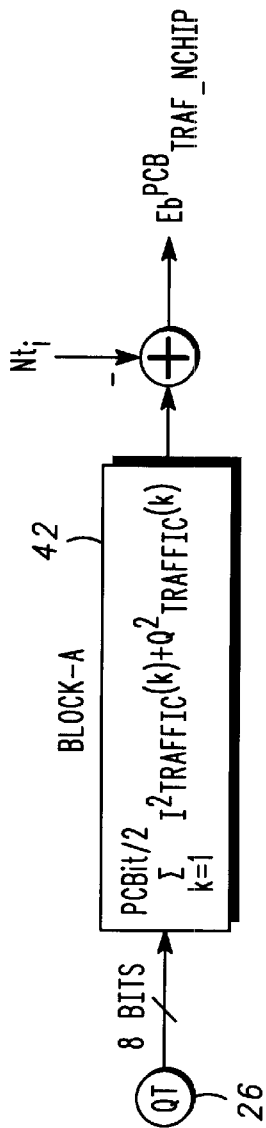
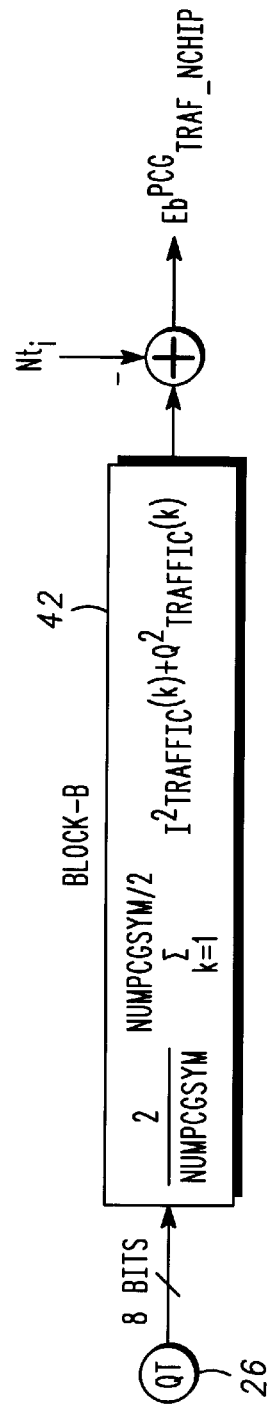

METHOD AND AN APPARATUS FOR EB/NT ESTIMATION FOR FORWARD POWER CONTROL IN SPREAD SPECTRUM COMMUNICATIONS SYSTEMS

FIELD OF THE INVENTION

The present invention relates generally to wireless communications. More particularly, the invention is directed to improved power monitoring in a code division multiple access (CDMA) wireless communication system.

BACKGROUND OF THE INVENTION

The relative power used in each data signal transmitted by the base station in spread spectrum communications systems require control in response to information transmitted by each remote unit. The primary reason for providing such control is to accommodate the fact that in certain locations the forward channel link may be unusually disadvantaged. Unless the power being transmitted to the disadvantaged remote unit is increased, the signal quality may become unacceptable. Thus, output power must be controlled to guarantee enough signal strength received at the base station and to maintain good quality audio while minimizing the potential for interference.

Additionally, since a CDMA wideband channel is reused in every cell, self interference caused by other users of the same call and interference caused by users in other cells represents a limiting factor to the capacity of the system. Moreover, the interference coming from the neighboring base stations may not fade with the signal from the active base station as would be the case for interference coming from the active base station. Due to fading and other channel impairments, maximum capacity is achieved when the signal-to-noise ratio (SNR) for every user is, on the average, at the minimum point needed to support "acceptable" channel performance. A remote unit in these situations may require additional signal power from the active base station to achieve adequate performance.

Communication systems are known to employ power control methods which control transmission energy of remote units. Power control in a spread spectrum system serves two main functions. Firstly, because each remote unit's signal in a spread spectrum system is typically transmitted in the same frequency, a majority of the noise (i.e., inversely proportional to bit energy per noise density, i.e., Eb/N0, defined as the ratio of energy per information-bit to noise-spectral density), associated with a received signal can be attributed to other remote units' transmissions. The magnitude of noise is directly related to the received signal power of each of the other remote units' transmissions. Thus, it is beneficial for a remote unit to transmit at a low power level. Secondly, it is desirable to dynamically adjust the power of all remote units in such a way that transmissions are received by the base station with approximately the same power level.

Dynamic power control of the mobile station's transmitter includes two elements: open loop estimation of transmit power by the mobile station, and closed loop correction of the errors in this estimate by the base station. In open loop power control, each mobile station estimates the total received power on the assigned CDMA frequency channel. Based on this measurement and a correction supplied by the base station, the mobile station's transmitted power is adjusted to match the estimated path loss, to arrive at the base station at a predetermined level. Differences in the forward and reverse channels, such as opposite fading may occur due to the frequency difference and mismatches in the mobile station's receive and transmit characteristics. This may not be readily estimated by the mobile station. Each mobile station corrects its transmit power with closed loop power control information supplied by the base station via low rate data inserted into each forward traffic channel. The base station increases and reduces its outbound power between the base station and the mobile communication units in a dispatch situation, with the forward power control scheme for the base station responding to requests required by the communication units. The base station derives the correction information by monitoring the CDMA channel quality of each mobile station, compares this measurement to a threshold, and requests either an increase or decrease depending on the result.

BRIEF DESCRIPTION OF THE DRAWINGS

FIG. 3 illustrates Eb estimation per finger for variable frame rate;

FIG. 4 illustrates Eb estimation per finger for fixed frame rate;

DETAILED DESCRIPTION OF THE PREFERRED EMBODIMENTS

Figure 1:
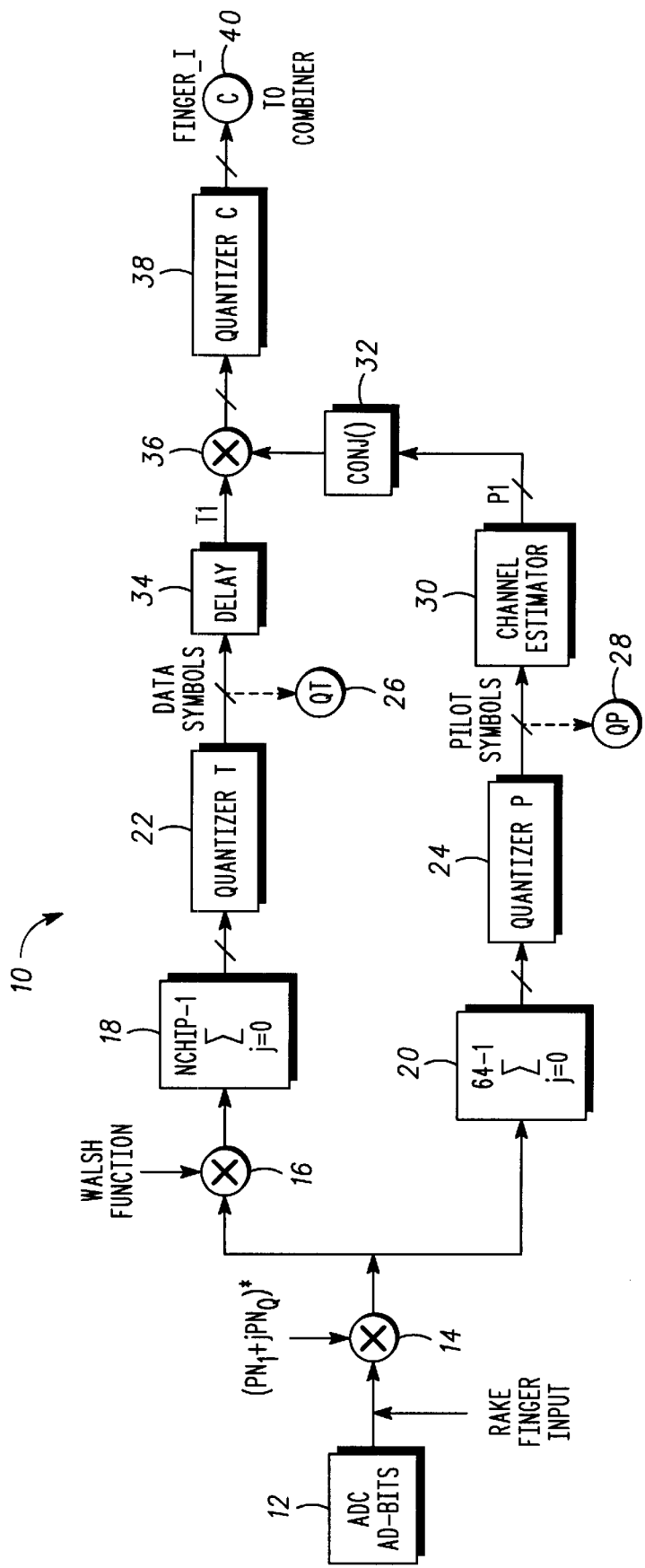
FIG. 1 illustrates the fixed-point RAKE receiver implementation per finger.

The calculation of the total Eb/Nt estimation for inner loop forward power control in CDMA2000 mobile station is achieved with minimal hardware using a method and an apparatus for Eb/Nt estimation for inner loop forward power control in CDMA2000 mobile station. This scheme performs total Eb/Nt estimation using unrotated traffic symbols, e.g., traffic symbols prior to pilot weighting before the combiner, prior to RAKE combiner. In the combiner, the time aligned and pilot weighted traffic symbols from all the multipaths are added together. Thus, it results in 50 percent hardware reduction from about 15K gates to about 7K gates. Herein, the Eb/Nt estimation per RAKE finger for the forward traffic channel is done using unrotated reverse PCB symbols for Eb estimation in case of variable rate frames, unrotated forward traffic symbols for Eb estimation in case of fixed-rate frames, and pilot symbols integrated over 64 chips per RAKE finger for noise power estimation. The estimated noise power is scaled according to the traffic Walsh length before calculating the Eb/Nt.

The existing CDMA Interim Standard (IS-95 et seq.) was developed by the Telecommunications Industry Association (TIA) and Electronics Industry Association (EIA). In IS-95, when a transmission rate is utilized which is less than the full rate, a discontinuous (burst type) signal is transmitted. This signal is divided into logical frames which are 20 ms (milliseconds) in length. The frames are divided into 16 smaller portions (or slots) which are referred to as power control groups. The base station demodulator estimates the energy of each power control group received from the mobile station.

In CDMA2000, the mobile station needs to support both inner and outer power control loops for the forward link traffic channel power control. The outer power control loop in the mobile station (MS) estimates a target Eb/Nt setpoint value required to achieve the target frame error rate (FER) on each assigned forward traffic channel. The inner power control loop compares the estimated Eb/Nt of the received forward traffic channel with the corresponding target Eb/Nt setpoint. This determines the value of the power control bit to be sent to the base station on the reverse power control subchannel.

The reverse power control subchannel in the mobile station supports both the inner power control loop and the outer power control loop for forward traffic channel power control. The outer power control loop estimates the setpoint value based on Eb/Nt to achieve the target frame error rate (FER) on each assigned forward traffic channel. These setpoints are communicated to the base station, either implicitly through the inner loop, or explicitly through signaling messages. The differences between setpoints help the base station derive the appropriate transmit levels for the forward traffic channels that do not have inner loops. The inner power control loop compares the Eb/Nt of the received forward traffic channel with the corresponding outer power control loop setpoint to determine the value of the power control bit to be sent to the base station on the reverse power control subchannel. The mobile station shall transmit the erasure indicator bits (EIB) or the quality indicator bits (QIB) on the reverse power control subchannel upon the command of the base station.

In case of variable data rates, the punctured reverse link power control bits (transmitted on the forward link) are used for the Eb estimation. In case of fixed data rates the traffic Eb estimation is performed on all the traffic bits within that power group. Noise (Nt) is calculated from the common pilot channel. In our scheme, the Eb and Nt estimations are done on each individual RAKE fingers. These are combined for the total Eb and Nt estimates. The simplified RAKE receiver is described below in connection with FIG. 1. The comparative simulation results of the proposed method with respect to no power control are given. The simplified mobile station RAKE receiver disclosed in FIG. 1 is used for the proposed scheme.

At the front end of the system 10, analog to digital converters 12 (ADCs) are common to all three architectures. A typical finger rake architecture is shown in FIG. 1. In the multifinger rake architecture, duplicate structures are provided. For example, with three (3) multipaths, a three-finger rake architecture, with three duplicate structures as shown in FIG. 1. All three fingers, the A, B, C, blocks, form a common point for all three fingers to form a three-finger or three multipath combiner. Each RAKE finger input is presented to a digital mixer 14 for multiplication with a complex factor to separate the traffic (T) and pilot (P) signals. A Walsh function operates on the traffic signal at mixer 16 and a summation 18 integrates N chip input signals. Similarly, the pilot path provides a summation 20 over 64 chips in the described embodiment. As discussed further below, for the traffic (T) path a quantizer 22 outputs data symbols 26 (QT) as quantized traffic data, and the pilot (P) signal is generated at quantizer 24 which outputs pilot symbols 28 (QP). A channel estimator 30 operates on the pilot symbols 28 followed by a complex conjugate function 32 for mixing the pilot and traffic paths via delay 34 being multiplied at 36 prior to quantizer 38.

Figure 2:
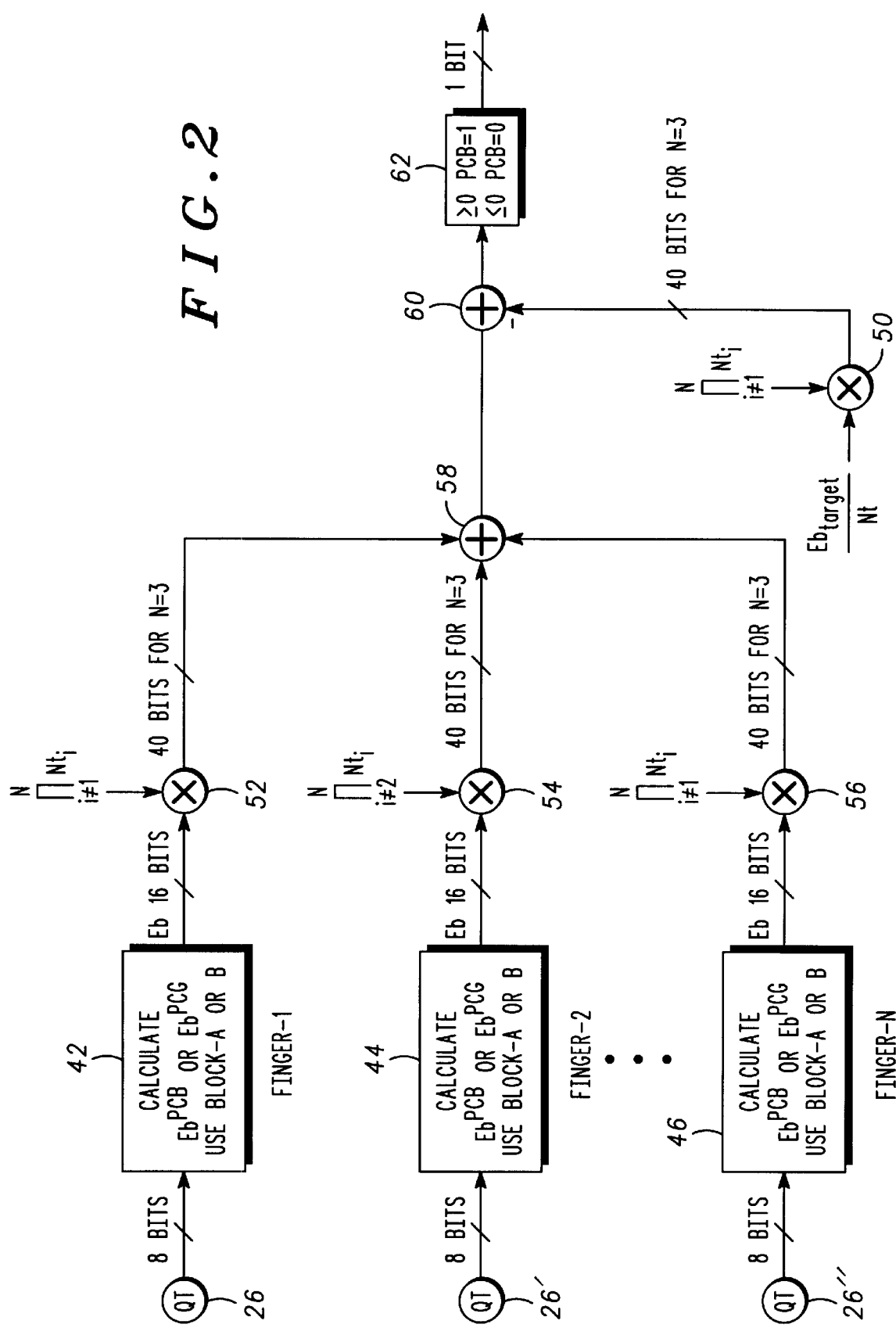
FIG. 2 illustrates the proposed method for inner loop forward power control, with an Application Specific Integrated Circuit (ASIC) implementation.

With reference to FIG. 1, input C provides an input 40 to the combiner of system 10, which may be called Finger_i, e.g., Finger_1. With reference to FIG. 2, another architecture is provided for Finger_2, and so forth. QT (22, 26', 26") are tapped from the RAKE 10 for Eb energy calculations 42, 44, and 46 (1 to N). These outputs go to a circular buffer (not shown), and in the circular buffer all the fingers, fingers 1, 2, ... N, or their symbols, are added to each other. After the addition the Eb is measured. Each RAKE combiner output 40 as described below sends a power control symbol for the three replicas of the power control symbols generated at the receiver because the multipaths from the base station to the handset, have, e.g., three multipaths. Thus, to find out what the total energy is, combine all these symbols at C and then measure the combined symbols.

As discussed in connection with FIG. 2, combined energy or combined symbol from the forward loop control is output as one binary symbol 62. This represents the optimum way of measuring the combined energy after summing all these symbols coming from different multipaths.

Generally, the Eb/Nt is derived after input C, after all the multiple fingers have been combined, which is an optimum, but rather complex approach in terms of hardware. However, it is observed that there is relatively little complexity to obtaining Eb at point C, but the complexity is, as discussed below, where there are two paths, one called QP 28, which is called the pilot path, and the other path, QT 26, which is called the traffic path, i.e., data symbols and pilot symbols. The energy of the data symbols is of interest, so after multiplication of the two paths at junction 36, the pilot symbols are multiplied with the data symbols. The energy of the symbols on the traffic path, QT, is of interest, and thus, the signals are multiplied at Point P1, QT and QP. However, since P alone is of interest, the energy of QT for the multipath, e.g., at finger_i, is desired with the T block representing all the multipaths added to each other, i.e., multiplied by their corresponding pilot paths.

Since it would be desirable to get rid of these pilot multiplications, and to multiply the noise of each multipath or each finger by its corresponding pilot path, the pilot weighting of Eb divided by Nt total represents very complex hardware in terms of calculation of the noise. Eb by default is multiplied by the pilot data, but noise power in each of the fingers also needs to be multiplied by their corresponding pilot paths.

Thus, before multiplication of these traffic symbols by pilot symbols, the traffic signals may be captured at QT points for each multipath, without using the pilot data. Accordingly, some accuracy may be lost because the traffic and the pilot signals rotate with the same phase as the channel, e.g., a direct current (DC) constant from the base station with the multiplication of the DC constant by each point jω represented with a rotating angle having magnitude changing in time. Thus, at the receiver, a sinusoidal waveform is generated on traffic as well as pilot. The pilot path then requires that the complex conjugate of the sinusoidal waveform be taken and multiplied with the sinusoidal waveform itself, to get the DC constant magnitude from the receiver. This is also known as derotation to get rid of the phase rotation in the channel that is induced in the channel to the base station signal. Therefore, by not multiplying the traffic signal by the complex conjugate of the pilot symbol, the actual symbol sent from the base station for the traffic signal is degraded by rotation. However, since the relatively short symbol integration used on traffic signals should not effect the calculation of power, there is little actual rotation observed. Thus, despite rotation, if the traffic signals are observed at the QT point after the rotation with the pilot, this much is lost. But in return a hardware savings of 7,000 gates versus 15,000 gates is achieved.

Figure 6:
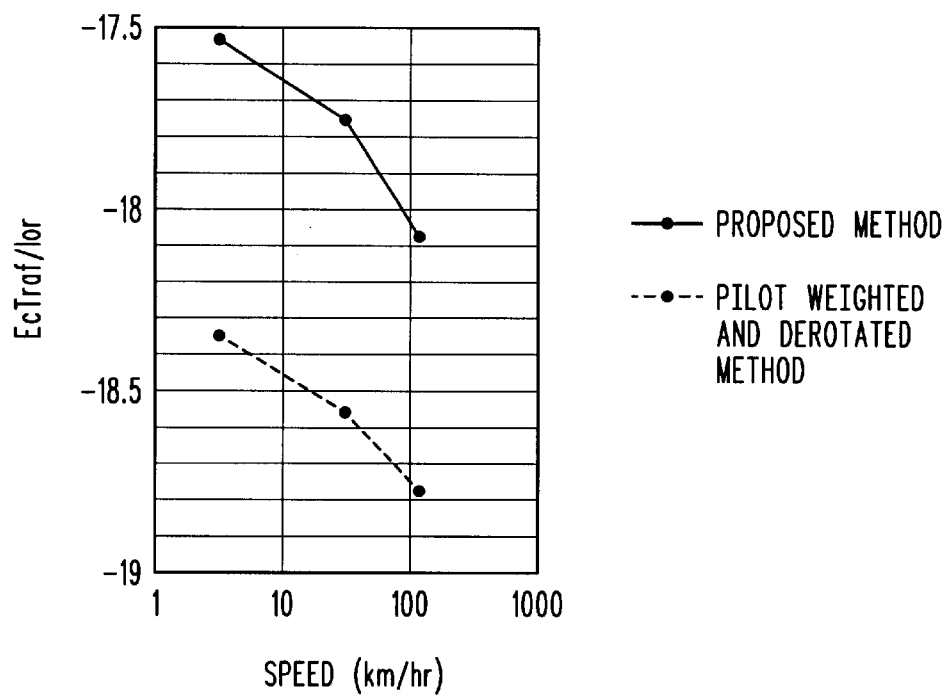
FIG. 6 is a graph showing the performance comparison between the proposed method and piloted weighted and pilot derotated PCB for Eb/Nt estimation.

With reference to FIG. 6, the vertical axis shows, e.g., −17.5 dB, which represents 0.6 dB more than the pilot signal weighted to achieve the same error rate, i.e., a 1 percent rate with the same speed. Thus, the system performs an amplification of signals of 0.6 dB more than needed. Thus, for the same performance a higher Eb/Nt which is 0.6 dB more than optimum is required to receive the same rate, but this is considered negligible.

Forward power control implementation in which inner loop power estimation is calculated for the total $$\frac{Eb}{Nt}$$

uses unrotated traffic symbols for Eb estimation and pilot symbols for Nt estimation. This is compared with $$\frac{EB_{target}}{Nt}$$

(setpoint) every 1.25 ms to request power increase or decrease of the traffic channel from the base station. Combining individual $$\frac{Eb_i}{Nt_i} \ldots i = 1, 2 \ldots N$$

for each finger we get the total $$\frac{Eb}{Nt}$$

where the Eb and Noise estimation parameters are detailed in the next section.

$$\frac{Eb_1}{Nt_1} + \frac{Eb_2}{Nt_2} + \ldots \frac{Eb_N}{Nt_N} \leq \frac{Eb_{target}}{Nt} \quad \text{Eq. (1)}$$

By reordering Eq. (1), we can write Eb estimation for unrotated PCB based SNR calculation as, $$Eb_1 \prod_{i \neq 1}^{N} Nt_i + Eb_2 \prod_{i \neq 2}^{N} Nt_i + \ldots + EB_N \prod_{i=1}^{N-1} Nt_N \leq \frac{Eb_{target}}{Nt} \prod_{i=1}^{N} Nt_i \quad \text{Eq. (2)}$$

Using Eq. (2), the proposed simplified inner loop power control algorithm implemented with FIG. 2 in an Application Specific Integrated Circuit (ASIC) uses only multipliers 50, 52, 54, and 56, and adders 58, 60 followed by a threshold 62 for bit data determination. The input QT and QP as quantized traffic and pilot symbols are provided from the circuitry of FIG. 1. At the end of each frame the $$\frac{Eb_{target}}{Nt}$$

is updated as discussed in connection with the forward link power control simulation.

Since the multipath signals arrive through different paths, their amplitudes and phases vary independently at the receiving point. In particular, fading occurs in mobile channels because the characteristics of a channels fluctuate with the movement of a mobile station. Multipath dispersion occurs when a signal proceeds to the receiver along not one but many paths so that the receiver hears many echoes having different and randomly varying delays and amplitudes. Thus, when multipath time dispersion is present in a CDMA system, the receiver receives a composite signal of multiple versions of the transmitted symbol that have propagated along different paths (referred to as "rays") having relative time delays of less than one symbol period. Each ray that is received after the symbol period (i.e., if the time delay caused by a reflection exceeds one symbol period) appears as an uncorrelated interfering signal that reduces the total capacity of the communication system. To optimally detect the transmitted symbols (bits), the spikes received must be combined. Typically, this is done by the RAKE receiver, which is so named because it "rakes" all the multipath contributions together.

The RAKE receiver uses a form of diversity combining to collect the signal energy from the various received signal paths, i.e., the various signal rays. Diversity provides redundant communication channels so that when some channels fade, communication is still possible over non-fading channels. A received radio signal is demodulated by, for example, mixing it with cosine and sine waveforms and filtering the signal in an RF receiver 1, yielding I and Q samples. A CDMA RAKE receiver combats fading by detecting the echo signals individually using a correlation method and adding them algebraically (with the same sign). Further, to avoid intersymbol interference, appropriate time delays are inserted between the respective detected echoes so that they fall into step again.

Current implementations of mobile stations use a "finger lock" mechanism to exclude unreliable power control signals from the decision logic. The outputs at the RAKE taps are combined with appropriate weights. The receiver searches for the earliest ray by placing RAKE tap outputs having significant energy appropriately weighted and combined to maximize the received signal to noise and interference ratio. On each finger of the RAKE receiver, the demodulated signal energy is compared to a threshold which represents a minimum energy required to reliably use power control data from that finger.

Correlation values of the signature sequence with the received signals at different time delays are passed through a delay line that is tapped at expected time delays (dt), the expected time between receiving echoes.

Generally, the RAKE receiver apparatus operates to detect the phases of pseudo noise (PN) codes of signals from the multipaths are demodulated in corresponding independent demodulators by use of a plurality of demodulating fingers as receivers, corresponding in number to the multipaths, respectively. The results obtained from the receivers after the demodulation are coupled together in a combiner to extract desired timing information and demodulated data.

Referring again to FIG. 1, the conventional arrangement of such a RAKE receiving apparatus is illustrated, a plurality of demodulating fingers and a post-processing combiner (adapted to extract demodulation data, timing information and frequency information). Based on the result of the operation, the demodulating fingers carry out their demodulation operations. The demodulating fingers operate individually to demodulate signals associated therewith. The combiner combines the results of the modulation operations respectively carried out in the demodulating fingers, thereby extracting required data and timing information.

For variable frame rate the traffic Eb estimation is obtained using only the reverse power control bits that are punctured on the forward traffic channel. In the case of fixed rate, Eb estimation is performed over all the traffic bits.

The Eb estimation for variable and fixed rate frames are implemented as in FIG. 3 and FIG. 4, respectively.

Figure 5:
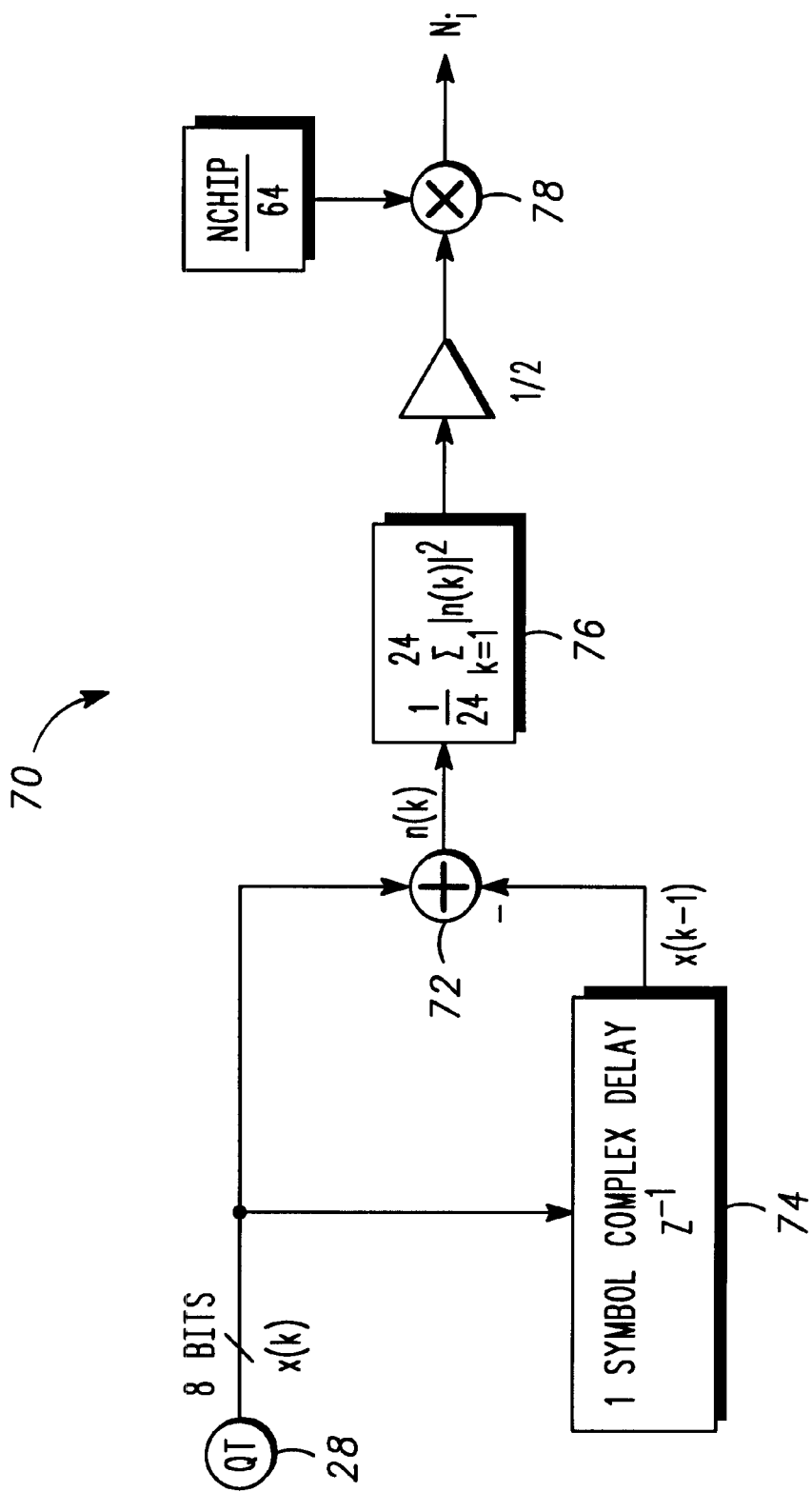
FIG. 5 illustrates fixed-point implementation for noise power estimation using 1-tap high-pass filter.

The noise power estimation is implemented using 1-tap high pass filter 70 shown in FIG. 5. In this method, the delayed pilot symbol is subtracted at 72 from itself to calculate the noise power, such as:

$$E\{|n(k)|^2\} = \frac{1}{N}\sum_{k=1}^{N}|n(k)|^2 \qquad \text{Eq. (3)}$$

where $$n(k)=y(k)-x(k-\text{delay}) \qquad \text{Eq. (4)}$$

with delay=1 pilot symbol duration with a one (1) symbol complex delay block 74.

Nt is calculated over 64 chips of Pilot while the Eb of the traffic is calculated over a Walsh length (Nchip=8,16,32,64 for 128 chip duration). This is accomplished with an integrate/dump accumulator 76 at every power control group (PCG). Thus, a scaling at 78 is performed on noise calculation over the pilot channel such that correct Eb/Nt is calculated as:

$$\frac{Eb_{traf}}{Nt} = \frac{Eb^{PCB}\text{traf\_Nchip}}{Nt} \cdot \frac{1}{\frac{Nchip}{64}} \qquad \text{Eq. (5)}$$

The simulation results for the forward link power control are obtained with the following parameters and assumptions:

Maximum Traffic Channel Transmit Ec/Ior=−4 dB
Minimum Traffic Channel Transmit Ec/Ior=−32 dB
Inner Loop Power Control Step size=0.5 dB
Outer Loop Power Control Step Up size=0.5 dB
Outer Loop Power Control Step Down size=

$$\text{STEP\_DOWN} = \frac{\text{STEP\_UP}}{\left[\frac{1}{\text{TARGET\_FER}} - 1\right]} \qquad \text{Eq. (6)}$$

For the nth PCG mobile station measurement, the base station applies the change in the (n+2)th PCG.

The Nt measurement is based on the pilot symbols over an entire power group.

The PC bits are transmitted at the same power level as full rate traffic.

Reverse power control bit (PCB) error is set to 1 percent.

The performance of the pilot weighted based Eb/Nt estimation method for inner loop power control is 0.6 dB better than the proposed method, as shown in FIG. 6.

Figure 7:
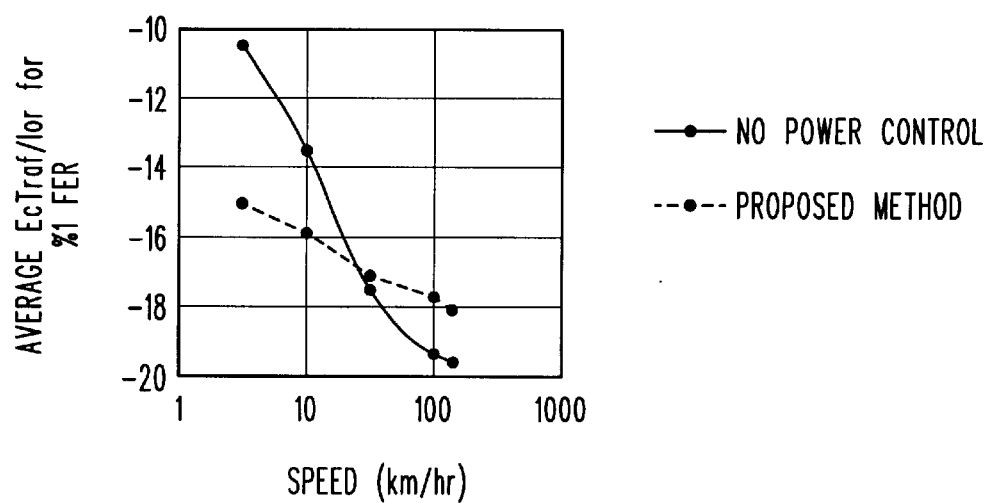
FIG. 7 and FIG. 8 are graphs showing the performance comparison between no-power control and the proposed method with forward power control.
Figure 8:
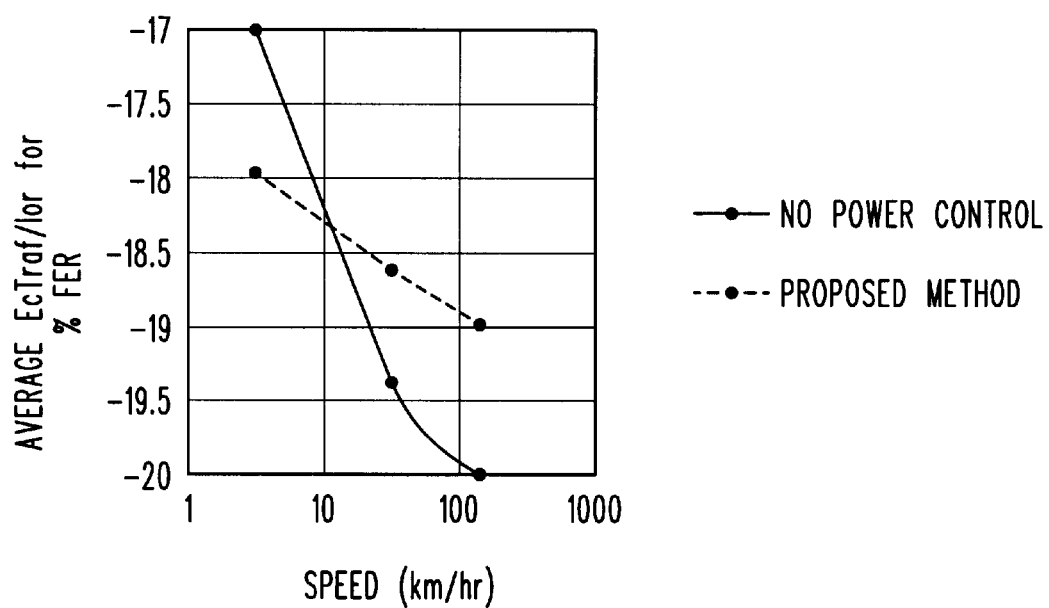

Performance comparison of the proposed method with respect to now power control system is given in FIG. 7 and FIG. 8 for 1-path and 2-path Rayleigh channels, respectively.

From FIG. 6 it is seen that Eb/Nt estimation using pilot weighted PCB symbols after combiner is 0.6 dB better than the proposed one. However, the hardware is more complex than the proposed method.

At slow mobile speeds the proposed method for forward power control method provides more than 5 dB and 1 dB performance improvements for 1-path and 2-path Rayleigh channels, respectively. At higher mobile speeds, the performance of the system degrades when the forward power control method is on.

While the foregoing described embodiments have been set forth above, it will be appreciated to one skilled in the art that the invention described has applications beyond the described embodiments. Accordingly, it is intended that the scope of the invention including such alternatives, modifications, and variations contemplated shall be defined by the appended claims.

What is claimed is:

1. An apparatus for estimating bit energy per noise density for forward power control in spread spectrum communications systems, the apparatus comprising:

a RAKE receiver front end that separates traffic data symbols from pilot symbol information of individual multipath signal inputs to provide a traffic path and a pilot path;

a first integrator in the traffic path for calculating data symbol bit energy;

a second integrator in the pilot path for calculating noise density; and an estimator employing a forward power control algorithm using the data symbol bit energy calculated with said first integrator as an unrotated power control bit taken from the traffic path for comparison with the noise density calculated with said second integrator from the pilot path to provide the estimation of the bit energy per noise density.

2. An apparatus as recited in claim 1, wherein the bit energy of the traffic path is calculated over a Walsh length.

3. An apparatus as recited in claim 2, wherein the bit energy per noise density estimation is performed for the forward traffic channel using pilot symbols integrated over 64 chips per finger with the estimated noise power being scaled according to the traffic Walsh length prior to calculating the bit energy per noise density.

4. An apparatus as recited in claim 1, comprising a first quantizer at the output of said first integrator for determining the data symbol values in the traffic path.

5. An apparatus as recited in claim 1, comprising a second quantizer at the output of said second integrator for determining the pilot symbol values in the pilot path.

6. An apparatus as recited in claim 5, further comprising a channel estimator in the pilot path following said second quantizer.

7. An apparatus as recited in claim 1, wherein said estimator performs the forward power control algorithm over each finger of the individual multipath signal inputs to determine a power control bit.

8. An apparatus as recited in claim 7, wherein the bit energy per noise density estimation is performed with unrotated power control bit symbols for Eb estimation in the case of variable rate frames.

9. An apparatus as recited in claim 7, wherein the bit energy per noise density estimation for the forward traffic channel is performed using unrotated forward traffic symbols for Eb estimation in the case of fixed rate frames.

10. An apparatus as recited in claim 7, wherein said estimator obtains inner loop power control at approximately 0.6 dB to optimum width approximately 50 percent fewer gates in the hardware implementation of the estimator employing the forward power control algorithm versus the performance of the pilot weighted based Eb/Nt estimation.

11. A method for estimating bit energy per noise density for forward power control in spread spectrum communication systems, the method comprising:

separating traffic data symbols from pilot symbol information with a RAKE receiver front end for individual multipath signal inputs to provide a traffic path and a pilot path;

integrating the traffic path to obtain the data symbol bit energy;

integrating the pilot path to obtain the noise density; and using the data symbol bit energy as an unrotated power control bit taken from the traffic path with a forward power control estimate for comparison with the noise density from the pilot path to provide the bit energy per noise density.

12. A communications apparatus, comprising:

a RAKE receiver front end having a traffic path and a pilot path;

a first integrator in the traffic path;

a second integrator in the pilot path; and an estimator for estimating bit energy per noise density by comparing data symbol bit energy calculated as an unrotated power control bit calculated by the first integrator with noise density calculated by the second integrator.

13. An apparatus as recited in claim 12, wherein the bit energy per noise density estimation for the forward traffic channel is performed using unrotated forward traffic symbols for Eb estimation in the case of fixed rate frames.

14. An apparatus as recited in claim 12, wherein the bit energy per noise density estimation is performed for the forward traffic channel using pilot symbols integrated over 64 chips per finger with the estimated noise power being scaled according to the traffic Walsh length prior to calculating the bit energy per noise density.

15. An apparatus as recited in claim 12, wherein said estimator obtains inner loop power control at approximately 0.6 dB to optimum width approximately 50 percent fewer gates in the hardware implementation of the estimator employing the forward power control algorithm versus the performance of the pilot weighted based Eb/Nt estimation.

* * * * *